United States Patent
Shanmugam (10) Patent No.: US 10,123,656 B2
(45) Date of Patent: Nov. 13, 2018

(54) THREE-DIMENSIONAL STIRRING/MIXING UTENSILS

(71) Applicant: Kenwood Limited, Havant, Hampshire (GB)

(72) Inventor: Sivaprakash Shanmugam, Havant (GB)

(73) Assignee: KENWOOD LIMITED, Hampshire (GB)

( * ) Notice: Subject to any disclaimer, the term of this patent is extended or adjusted under 35 U.S.C. 154(b) by 118 days.

(21) Appl. No.: 14/759,113

(22) PCT Filed: Dec. 18, 2013

(86) PCT No.: PCT/GB2013/053332
§ 371 (c)(1),
(2) Date: Jul. 2, 2015

(87) PCT Pub. No.: WO2014/106730
PCT Pub. Date: Jul. 10, 2014

(65) Prior Publication Data
US 2015/0335204 A1 Nov. 26, 2015

(30) Foreign Application Priority Data
Jan. 4, 2013 (GB) .................................. 1300097.1

(51) Int. Cl.
*A47J 44/02* (2006.01)
*A47J 36/24* (2006.01)
(Continued)

(52) U.S. Cl.
CPC ........... *A47J 44/02* (2013.01); *A47J 36/2483* (2013.01); *A47J 36/2488* (2013.01); *A47J 43/04* (2013.01);
(Continued)

(58) Field of Classification Search
CPC ..................................................... A47J 37/047
(Continued)

(56) References Cited

U.S. PATENT DOCUMENTS 3,380,671 A * 4/1968 Kubodera ............. B01F 9/0005
241/187
4,173,925 A * 11/1979 Leon ....................... A47J 27/14
219/389

(Continued)

FOREIGN PATENT DOCUMENTS

DE 67 421 8/1892
DE 371505 6/1923

(Continued)

OTHER PUBLICATIONS

English translation of JP 2012176331 to Nagao published Sep. 2012.*

(Continued)

*Primary Examiner* — Michael Laflame, Jr.
(74) *Attorney, Agent, or Firm* — Brinks Gilson & Lione; John C. Freeman (57) ABSTRACT

The invention provides stirring and/or mixing utensils such as pots, pans and the like, for preparing foodstuffs for consumption by mixing and possibly also heating them in an environment in which they can be tumbled or otherwise moved in three-dimensions. Utensils in accordance with some embodiments of the invention comprise cooking or frying utensils incorporating a food chamber that is mounted for rotation about three orthogonal axes. Utensils in accordance with other embodiments of the invention use, in combination, a food chamber mounted for rotation about two mutually orthogonal axes and a stirring device driven about the third axis.

13 Claims, 10 Drawing Sheets

(51) Int. Cl.
*H05B 6/80* (2006.01)
*H05B 6/36* (2006.01)
*H05B 6/12* (2006.01)
*B01F 9/00* (2006.01)
*B01F 15/06* (2006.01)
*A47J 43/04* (2006.01)

(52) U.S. Cl.
CPC .......... B01F 9/0001 (2013.01); B01F 9/0047 (2013.01); B01F 15/067 (2013.01); H05B 6/12 (2013.01); H05B 6/36 (2013.01); H05B 6/80 (2013.01); *B01F 2009/0072* (2013.01); *B01F 2015/062* (2013.01)

(58) Field of Classification Search
USPC ...... 219/385, 389, 390, 391; 99/348, 443 R; 366/53, 54, 62, 220
See application file for complete search history.

(56) References Cited

U.S. PATENT DOCUMENTS 5,512,733 A  4/1996 Takihawa et al.
5,613,774 A * 3/1997 Chandra ................. A47J 27/04
366/228
2003/0106886 A1  6/2003 Sang
2010/0243342 A1  9/2010 Wu et al.

FOREIGN PATENT DOCUMENTS

| DE | 1994 0881 | 3/2001 |
| JP | 2005-344777 A | 12/2005 |
| JP | 2008-006363 | 1/2008 |
| WO | WO 2010/031034 | 3/2010 |
| WO | WO 2010/150600 | 12/2010 |

OTHER PUBLICATIONS

Search Report dated May 1, 2013 from corresponding Great Britain Application No. 1300097.1 (1 page).
PCT/GB2013/053332 International Search Report dated Apr. 15, 2014 (3 pages).
Examination Report Under Section 18(3) in corresponding United Kingdom Application No. GB 1300097.1, dated Nov. 10, 2016, 6 pages.

* cited by examiner

THREE-DIMENSIONAL STIRRING/MIXING UTENSILS

This application claims priority to International Application No. PCT/GB2013/053332 filed Dec. 18, 2013 and to Great Britain Application No. 1300097.1 filed Jan. 4, 2013; the entire contents of each are incorporated herein by reference.

This invention relates to stirring and/or mixing utensils for foodstuffs, and it provides in particular such utensils capable of applying three-dimensional movement to foodstuffs.

Utensils in accordance with some embodiments of the invention comprise cooking or frying utensils, such as pots, pans and the like, and they are characterised by the use of a food chamber that is mounted for rotation about three orthogonal axes. Utensils in accordance with other embodiments of the invention are characterised by the use, in combination, of a food chamber mounted for rotation about of said two mutually orthogonal axes and a stirring device driven about the third axis.

Conventional cooking or frying utensils present difficulties in use because, if the foodstuffs are simply placed therein and heated, the take-up of heat differs significantly from place to place within the utensil. As a result, the foodstuffs tend to be heated unevenly and it can easily happen that foodstuffs in a lower region of the utensil (i.e. a region close to the heat source) can become fully cooked well before the foodstuffs in an upper region of the utensil. If nothing is done about it, then in these circumstances, by the time foodstuffs in the upper region of the utensil become properly cooked, the foodstuffs in the lower region become over-cooked and may well then stick to the bottom of the utensil. To prevent this happening, users tend to add more oil, which is unhealthy.

To overcome the problem of uneven cooking generally, continuous manual stirring of the contents of a utensil is often necessary, particularly when frying, stewing or when cooking thick soup with a heavy concentration of solid food. Such stirring activity is required so that heat may be evenly distributed to prevent scorching of the solid food, and also to prevent the solid food from sticking to the bottom of the cooking utensil.

Manual stirring of the contents of the cooking utensil, however, is quite demanding for some users, and in any event it is time-consuming and can divert attention from other cooking tasks that should be carried out at the same time. Accordingly, there is a need to provide a cooking utensil which is capable of automatically stirring and mixing its contents.

Automatic stirring arrangements proposed heretofore include static utensils provided with at least one stirring paddle or blade to keep the food moving. Such stirring paddles or blades, however, exhibit certain drawbacks and limitations, such as a relatively high power requirement for stirring viscous foodstuffs like stew, thick sauces, or rice. Other problems with existing proposals include a tendency to mix foodstuffs unevenly since, whilst paddles or blades may fully mix the foodstuffs at paddle or blade level, they tend to only partially mix, or not mix at all, foodstuffs above or below that level. Indeed, there is a tendency for such paddles or blades merely to push the foodstuff around, rather than actually mixing it.

Another prior proposal includes a cooking utensil enclosing a rotatable, spherical chamber which mixes food more evenly than a stirring paddle or blade. The spherical chamber is driven by an electric motor and spun about a central axis. Baffles attached to the inside wall of the spherical cooking chamber temporarily interrupt the tumbling action of the foodstuffs as the chamber rotates. This action is intended to enhance the mixing action.

However, a major limitation with such proposals is that the rotating cooking chamber can rotate about only one axis, which can still prevent or impede the heat reaching some parts of the foodstuff, especially when the chamber is quite full. Also, when the foodstuff contains multiple ingredients, there is a tendency for the different ingredients to separate, rather than becoming evenly mixed.

It has also been proposed, in JP-A-2008-6363, to churn materials in a globular container, as an alternative to magnetic stirring, with the specific aim of permitting the use of high frequency energy to heat the materials.

In addressing some at least of the aforementioned problems of the prior art, the present invention provides a stirring/cooking utensil comprising a stationary support structure supporting an electric motor, a chamber for containing foodstuffs to be stirred and/or cooked, means for heating said foodstuffs and means adapted to utilise rotational drive provided by said motor to rotate said chamber simultaneously about at least two substantially orthogonal and intersecting axes during a cooking/stirring procedure.

By this means, the foodstuffs are evenly mixed and uniformly heated.

In some preferred embodiments, the utensil is configured to facilitate rotation of said chamber through 360 degrees about all three said axes.

Preferably the heating means comprises one or more of: infra-red or microwave radiating means, induction coil heat transfer means, and thermal conduction or convection means.

Some preferred embodiments of the invention further provide means for varying the speed of operation of the motor, according to user requirement, and may also include programmable means for defining one or more predetermined cycles of operation suited to different procedures.

In some preferred embodiments, the stationary support structure and/or said chamber further comprise means for causing said chamber to adopt a predetermined attitude following termination of a cooking/stirring procedure, thereby to facilitate removal of prepared foodstuffs from said chamber.

It is arranged in some preferred embodiments that at least the outer surface of the chamber is substantially spherical, and that the stationary support structure comprises a closeable casing adapted to contain the chamber and carries three compound wheel assemblies conditioned to support said chamber and to rotate said chamber about said three substantially orthogonal and intersecting axes.

In embodiments of the kind described in the last preceding paragraph, it is preferred that each of the compound wheel assemblies comprises a main wheel portion rotatable about a respective one of said axes and formed with a plurality of circumferentially spaced gaps in its periphery; each said gap housing a respective smaller wheel portion rotatable about a respective axis perpendicular to a respective radius of the main wheel portion, with the smaller wheel portions being located such that the overall compound wheel assembly has a defined circumference.

Typically, each of the main wheel portions has associated therewith six smaller wheel portions evenly distributed around its circumference, and each compound wheel assembly is driven in rotation about its axis by means of a respective motor.

In some preferred embodiments, one or more compound wheel assemblies may be used in combination with alternative rotation-supporting arrangements, such as roller ball arrangements.

In alternative preferred embodiments of the invention, the stationary support structure is adapted to support the food-processing chamber for rotation within an outer yoke; the utensil further comprising means for utilizing the motor to drive the outer yoke in rotation about a first of said axes and a drive relay mechanism, mounted to the outer yoke, to convey drive from the motor to rotate the chamber about a second of said axes.

Preferably the structure further comprises an inner yoke configured as a paddle arrangement and mounted within the chamber for rotation about the third of said axes, in which case there is preferably also provided a second drive relay mechanism, mounted to the chamber, and adapted to rotate said paddle arrangement about the third of said axes.

Preferably the three axes are truly orthogonal and the chamber can rotate through a full 360 degrees about all three axes.

It will be appreciated that the invention is usable on foodstuffs generally, whether frozen, refrigerated, ambient, or above ambient temperature conditions, and can be used for both cooking and mixing, or simply to mix. Processes such as sautéing, frying, stir-frying, stewing or any cooking methods that involve mixing can be accomplished.

The utensil may utilize any convenient heating agency, such as infra-red or microwave radiation, induction coil heat transfer, thermal conduction or convection and/or any other heating means to produce the required heat for cooking the foodstuffs.

In some embodiments of the invention, the speed at which the chamber rotates can be varied according to user requirement.

In order that the invention may be clearly understood and readily carried into effect, some embodiments thereof will now be described, by way of example only, with reference to the accompanying drawings, of which:

FIGS. 2(*a*) and 2(*b*) show respectively the location of and a vertical section through the utensil, to illustrate the placement of one component of a wheel arrangement used to cause the food processing chamber of the utensil to move freely about three mutually orthogonal and intersecting axes;

Referring now FIGS. 1 to 6, a first exemplary embodiment of a utensil 10 according to the invention comprises a stationary main housing 12 fitted with a closure lid 14. Removably mounted within the housing 12, for 360 degree rotation about each of three orthogonal axes, is a spherical chamber 16 comprising a main chamber body 18 and a lid 20; the chamber 16 being intended to contain foodstuffs to be heated and/or mixed by means of the utensil 10.

Figure 1:
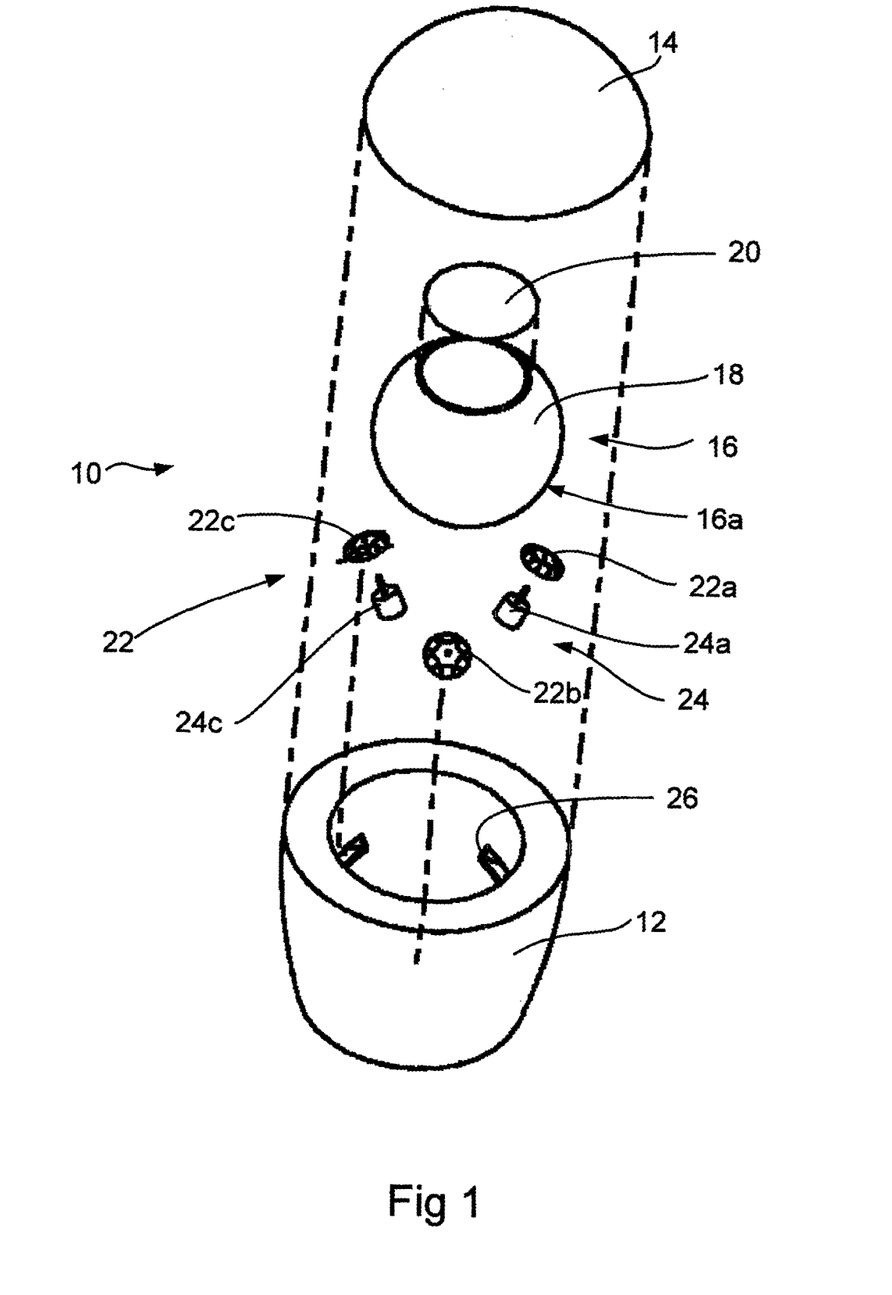
FIG. 1 shows a schematic and exploded view of a utensil in accordance with one embodiment of this invention.

In this embodiment, the main housing 12 also supports and/or contains a wheel assembly 22, an electric motor group 24, and a heating device or devices (not shown).

As stated, the spherical chamber 16 can be rotated freely through 360 degrees about all three mutually orthogonal axes within the housing 12. Accordingly, the chamber 16 can rotate in any direction and is not restricted to movement in any one plane.

The rotary motion of the chamber 16 is accomplished in this example by means of the wheel assembly 22 comprising three compound wheel assemblies, each comprising an omnidirectional wheel arrangement 22*a*, 22*b* and 22*c*; each arrangement being driven by a respective electric motor 24*a*, 24*b*, 24*c*. The spherical rotating chamber 16 is not constrained by any means to the stationary housing 12, so that it can move freely.

Figure 2A:
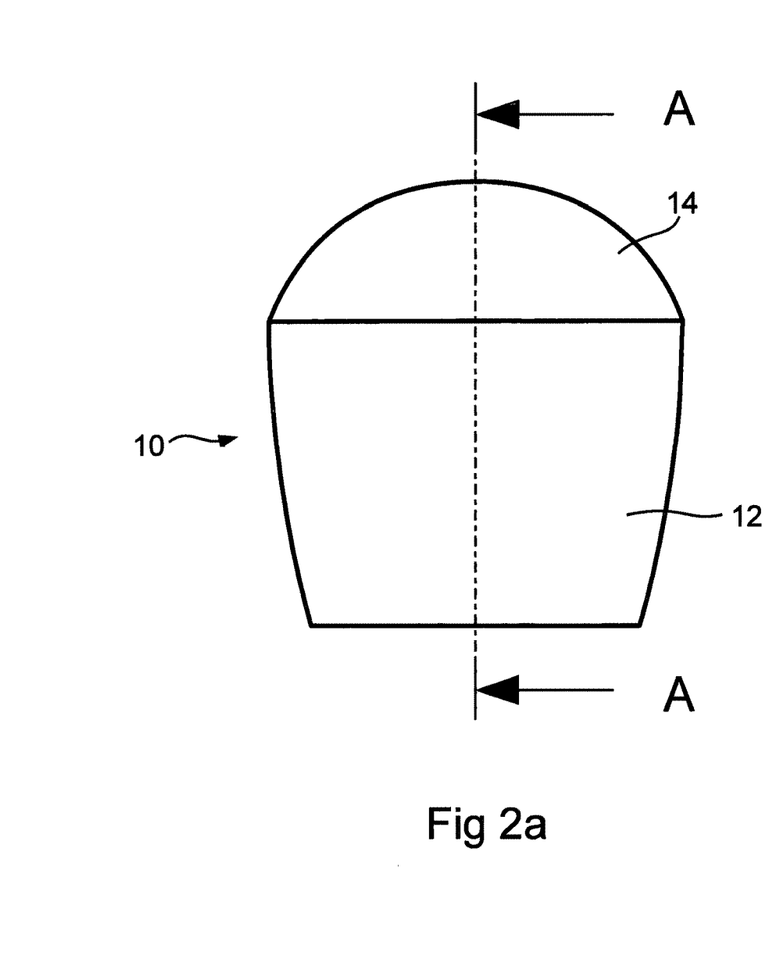
Figure 2B:
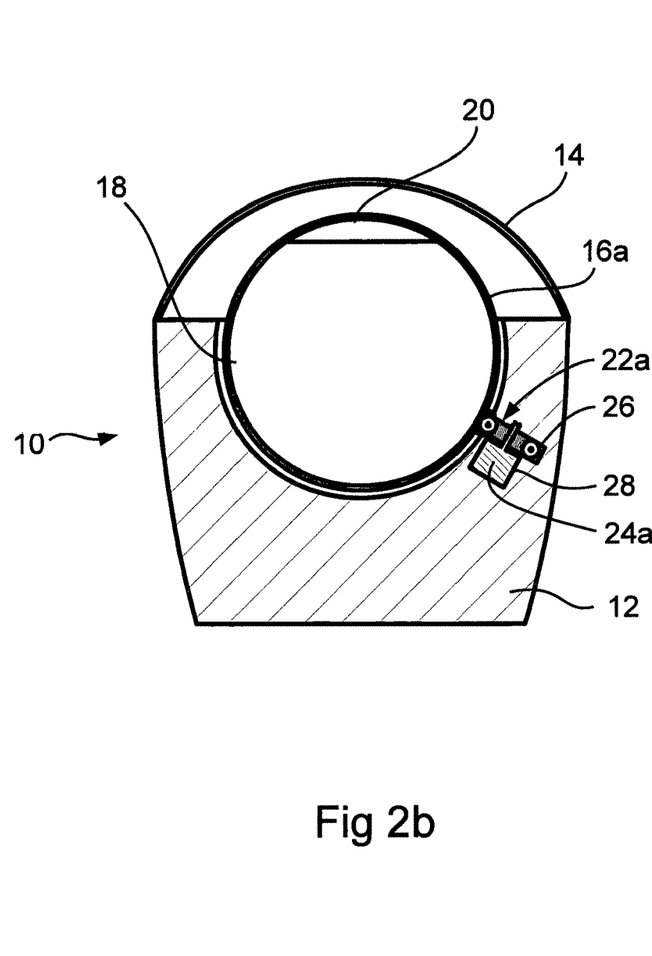

However, it is held in place by friction between its outer surface 16*a* and the three omnidirectional wheel arrangements 22*a*, 22*b* and 22*c*. Each wheel arrangement 22*a*, 22*b*, 22*c* is located in a respective recess such as 26 in the inner wall of the stationary housing 12, and the associated motor 24*a*, 24*b*, 24*c*, for each wheel arrangement is located in a respective adjoining recess such as 28, as best shown in FIG. 2(*b*).

Figure 3:
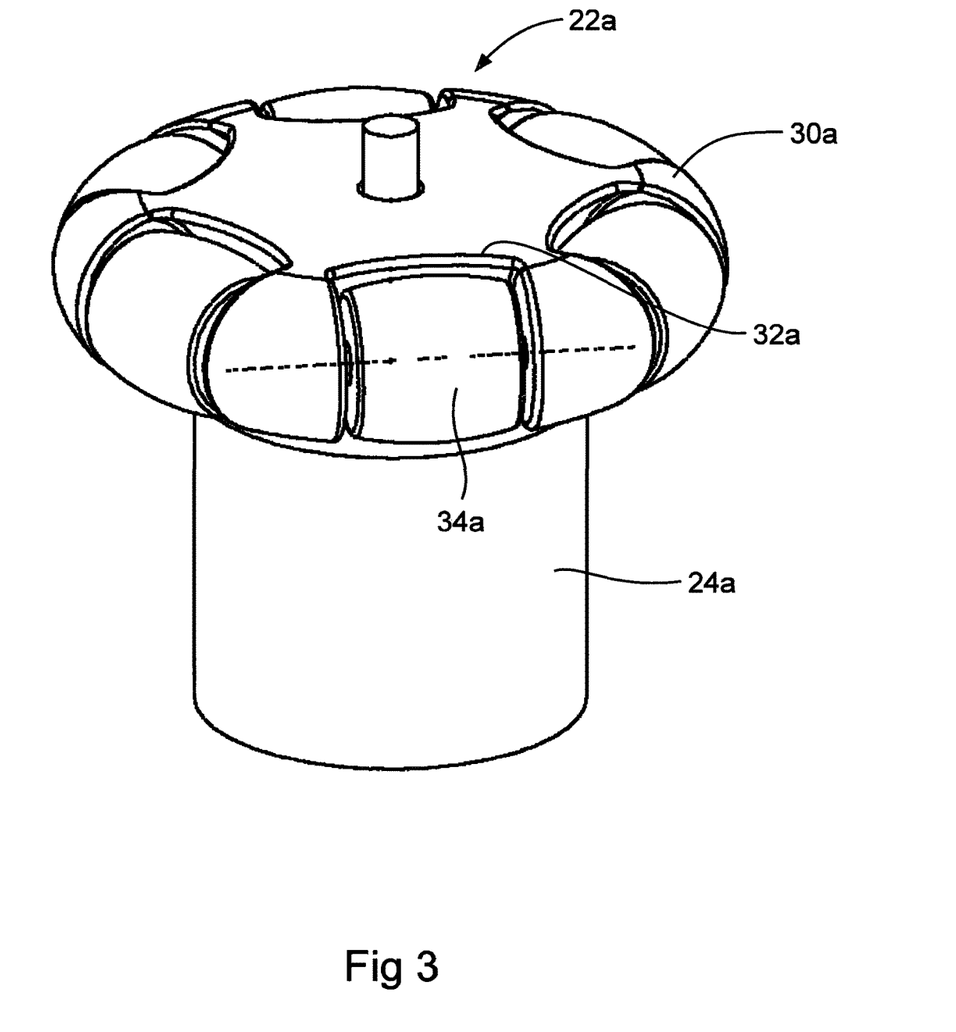
FIG. 3 shows a wheel arrangement in perspective view.

As best seen in FIG. 3, each wheel arrangement such as 22*a* is axially connected to its respective motor such as 24*a*, and the interaction of the driven wheel arrangements with the spherical chamber is effective to cause the chamber 16 to rotate randomly within the housing 12. The motors such as 24*a* are all completely enclosed within their respective recesses such as 28 (see FIG. 2(*b*)), whereas the wheel arrangements such as 22*a* protrude slightly from their respective recesses such as 26, so that the outermost edge of each of the wheel arrangements such as 22*a* assumes tangential contact with the spherical rotating chamber 16.

Figure 4:
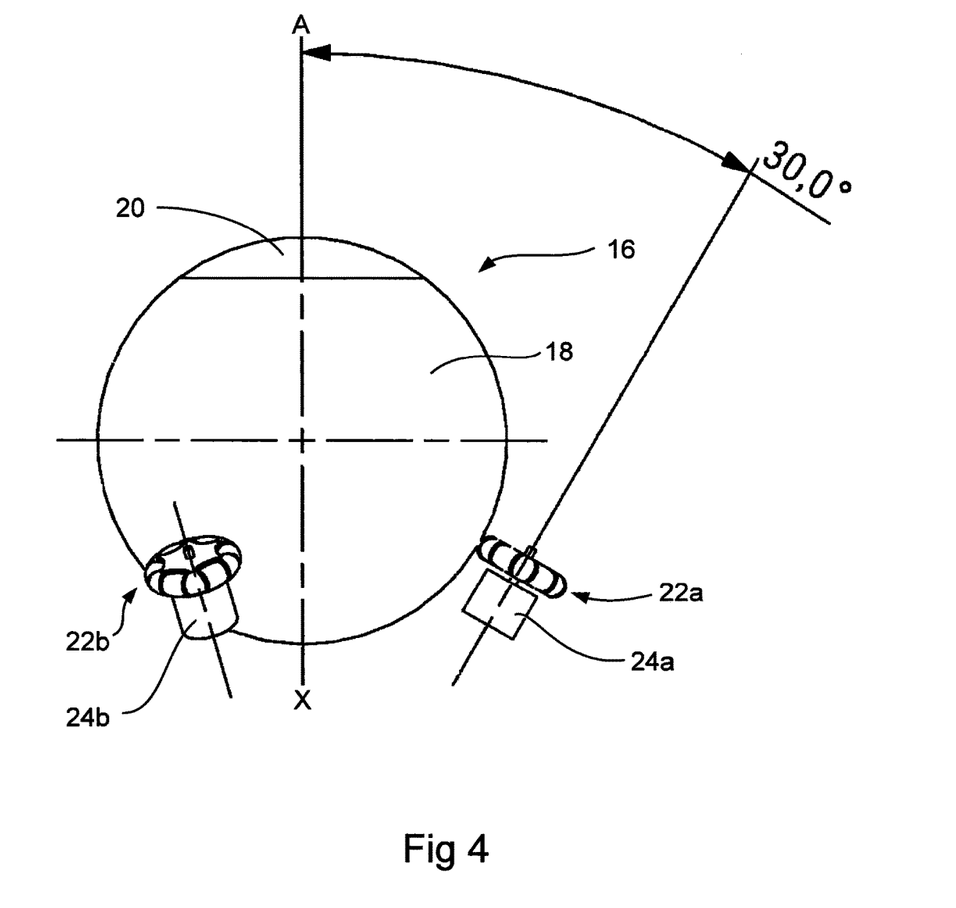
FIG. 4 shows schematically the relationship between the wheel arrangements and the chamber in one dimension.
Figure 5:
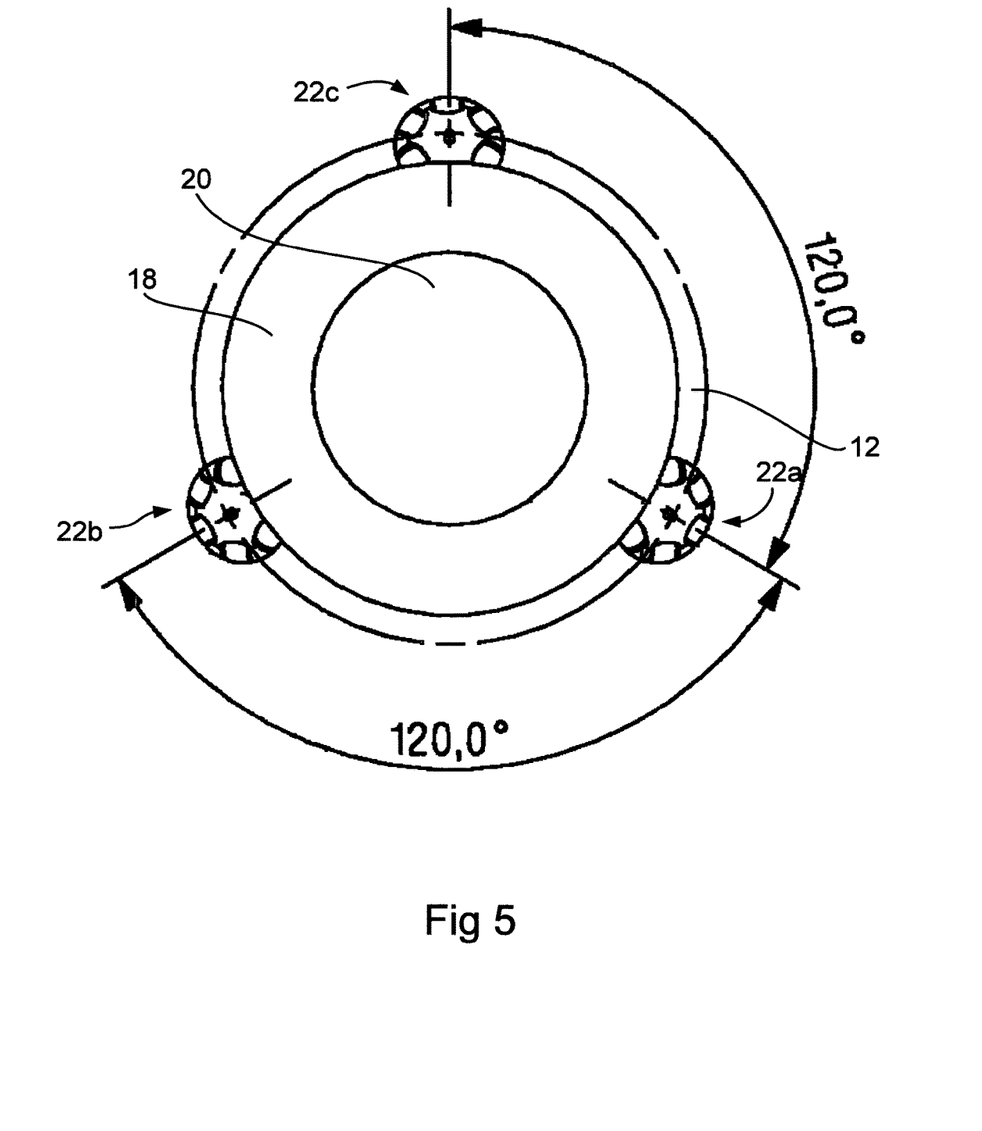
FIG. 5 shows schematically the relationship between the wheel arrangements and the chamber in an orthogonal dimension.

In this preferred embodiment of the invention, the three omnidirectional wheel arrangements 22*a*, 22*b* and 22*c* and their respective motors 24*a*, 24*b* and 24*c* are located such that in a vertical plane, the angle between the motor drive axis of each wheel arrangement and the centre axis AX of the spherical rotating chamber 16 is 30 degrees, as best seen in FIG. 4. Moreover, in a horizontal plane, the angle between each wheel arrangement and the others is 120 degrees, as shown in FIG. 5; this configuration being preferred since it provides optimal balance and symmetry. In other embodiments, however, different angular arrangements, and different numbers of wheel arrangements, can be used.

Each omnidirectional wheel arrangement such as 22*a* consists of a main, relatively large wheel 30*a* formed with spaces such as 32*a* to accommodate multiple smaller wheels such as 34*a*, as best seen in FIG. 3.

Figure 6:
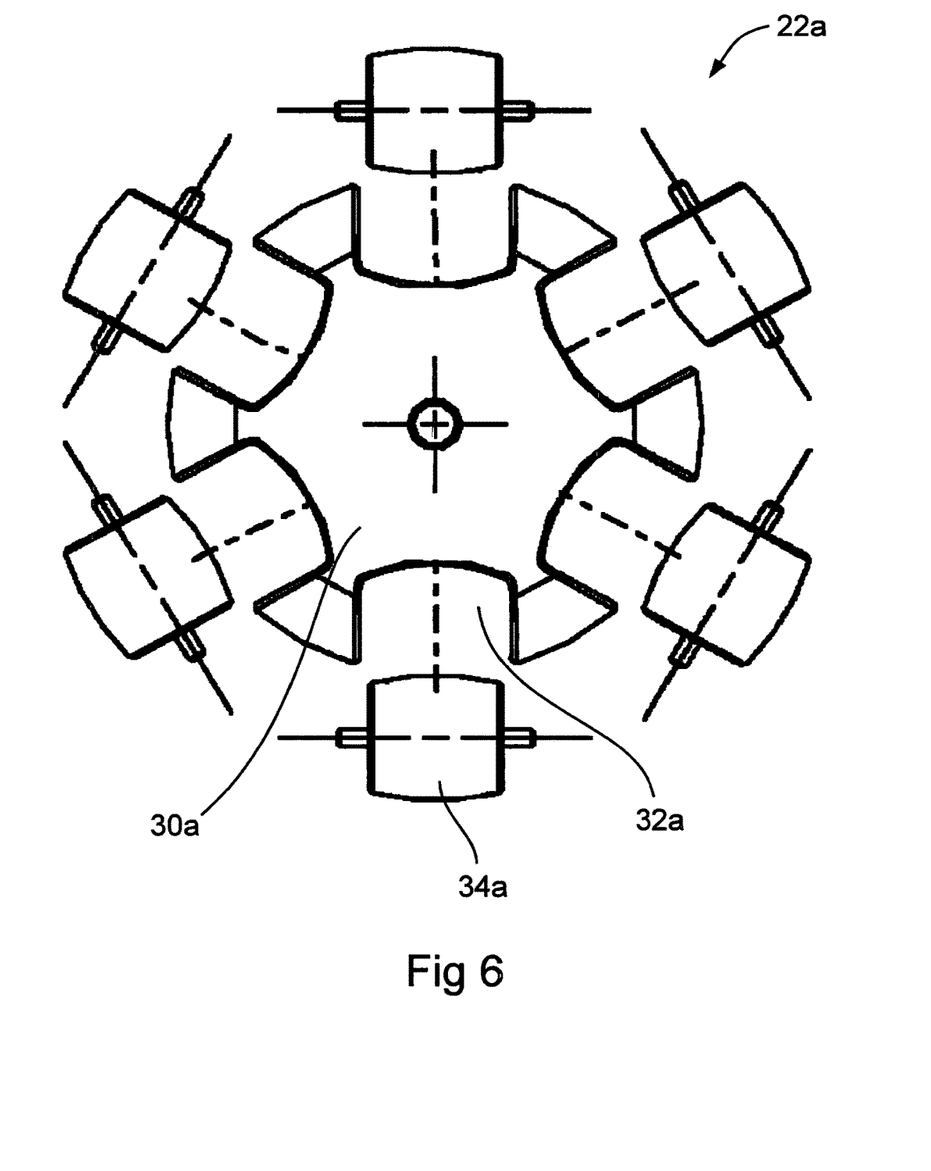
FIG. 6 shows an exploded diagram of a typical wheel arrangement.

Referring now to FIG. 6, each of the smaller wheels such as 34*a* rotates about a respective axis perpendicular to that of its associated larger wheel 30*a*, the axes of rotation of all of the smaller wheels such as 34*a* of a given arrangement such as 22*a* being co-planar, but with each such axis being orthogonal to a respective line radiating from the axis of the larger wheel such as 30*a*. In this example, each arrangement such as 22*a* includes six of the smaller wheels such as 34*a*, distributed symmetrically around the larger wheel 30a, so the angle between adjacent ones of the aforementioned radiating lines is 60 degrees. The power from the electric motor e.g. 24a) associated with each wheel arrangement such as 22a is transmitted only to its larger wheel 30a, while the smaller wheels act as guiding wheels, the combination of large and small wheels in all three arrangements 22a, 22b and 22c enabling the spherical rotating chamber 16 to rotate on any axis. The motors 24a, 24b and 24c are controlled electronically in accordance with a prescribed operational program to attain the necessary motion of the spherical chamber, allowing it to perform complete 360 degree rotations about all axes.

The motor driving program can be varied, for example in accordance with a number of discrete options individually selectable by user-operated controls and associated with different operations and/or functions.

Moreover, although, in this particular embodiment, it is preferred to use an assembly 22, comprising three wheel arrangements (22a, 22b and 22c) each with respective associated motors 24a, 24b and 24c, the necessary rotation of the spherical chamber 16 can alternatively be achieved using only one or two motors. Where just one motor is used (say 24a), the associated wheel arrangement 22a acts as a driver for the chamber 16 whilst the others (22b and 22c) act simply as guides. Furthermore, one or two wheel arrangements such as 24a can be used in conjunction with one or more guiding devices of entirely different kind. For example, a single wheel arrangement such as 24a can be used as the driver and a number (say two) of roller ball sets can be used as guides.

As previously mentioned, the spherical chamber 16 comprises a main container portion 18 and an opening and closeable lid 20, which conforms to the spherical profile of the main part 18 and, together with the main part forms a complete sphere. Of course, foodstuffs to be processed are placed into the chamber 16 by way of the lid 20, which is provided with means to latch it securely, so as to keep the chamber 16 closed during operation. As the spherical chamber 16 is simply placed inside the stationary housing 12 of the utensil 10, it can be easily taken out for cleaning.

The lid 14 of the stationary housing 12 has to be openable sufficiently to allow insertion and removal of the chamber 16. The housing 12 is provided with a heating device (not shown) of any chosen kind, as previously discussed, and it is preferred that the inner surface of the housing is made thermally conductive so as to facilitate the transfer of heat from the device to the spherical chamber 16 during its rotation.

In embodiments where one or more high-intensity infra-red lamps are used as the heating device, it can be advantageous to construct the chamber 16 of an optically transmissive medium to allow the infra-red radiation to impinge to enter the chamber and interact directly with the foodstuffs therein. Suitable infra-red sources and transmissive glasses are known, for example from halogen cook-top constructions.

It is desirable to provide an automatic means for ensuring that, once a heating/mixing cycle has been completed, the chamber 16 comes to rest in an upright position, with its lid 20 aligned with the lid 14 of the stationary housing 12, and therefore readily accessible for removal to allow the prepared foodstuffs to be ladled out of, or otherwise removed from the container part 18. In simple systems, this can be achieved by selectively weighting the container part, and/or by magnetic means. In more complex systems, the chamber 16 may be driven, either by one or more of the motors 24a, 24b or 24c, or by an additional servo motor until a designated region associated with a characteristic (e.g. coloured or reflective) indicator (not shown) provided on the outside of the chamber 16 aligns with a detector provided within the stationary housing 12, 14.

A second embodiment of the invention will now be described with reference to FIGS. 7 to 10.

In this second embodiment, the stationary housing 12 with the wheel arrangements and motors installed therein is replaced by a cage-like assembly comprising a food-containing chamber nested between two yoke-like fork assemblies and providing for a combination of tumbling and stirring operations to cause foodstuff movement about three mutually orthogonal axes of rotation.

Figure 7:
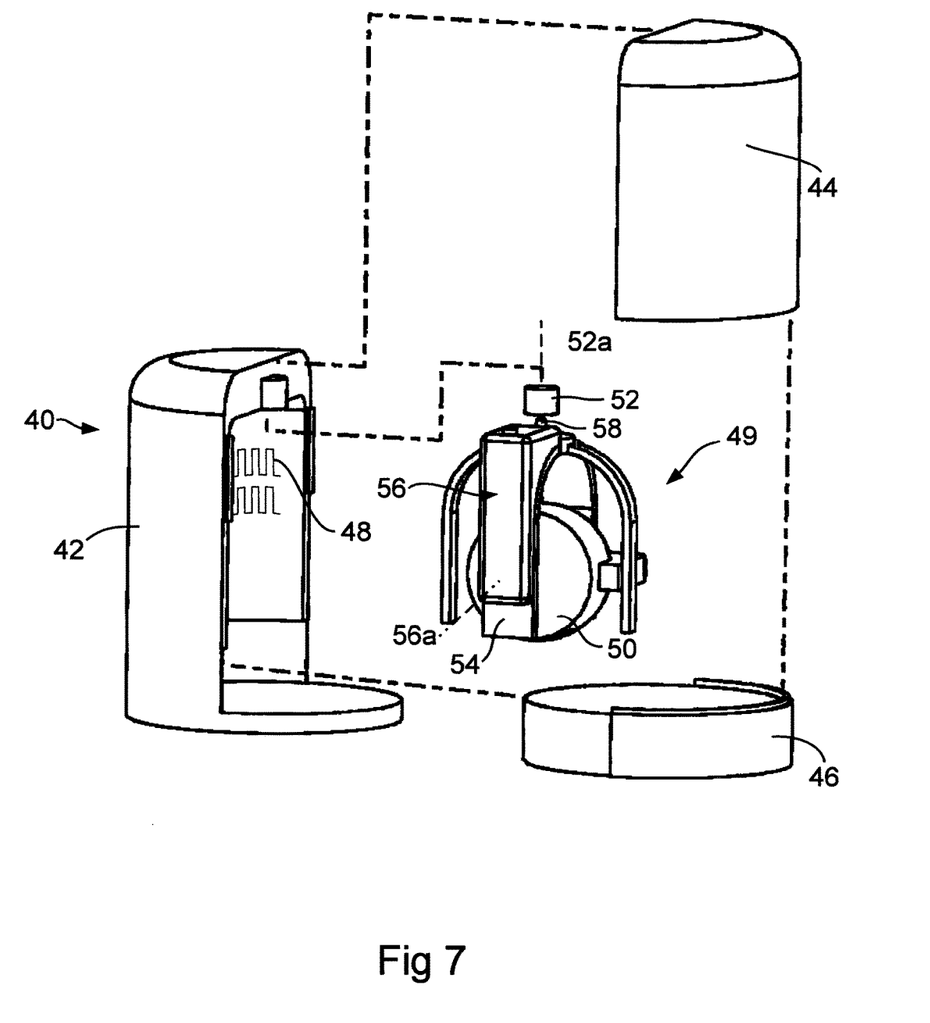
FIG. 7 shows a schematic and exploded view of a utensil in accordance with a second embodiment of this invention.

FIG. 7 illustrates a schematic, exploded view of this embodiment, in which the utensil 40 includes an outer casing comprising a stationary two-part housing and lid arrangement 42, 44, a base pan 46, a heating means, schematically shown at 48 as part of a printed heating track, and a rotating chamber assembly 49 including a circularly cylindrical chamber 50 with domed ends. It will be appreciated that the chamber 50 could conform to alternative geometric shapes, such as spherical, if desired.

The outer casing 42, 44 encloses the pan 46 and the rotating chamber assembly 49, and the part 44 is removable, providing access to the rotating chamber 50, into which foodstuffs are placed for mixing and cooking. At least part of the inner surface of the outer casing 42, 44 is made thermally conductive, thereby facilitating the transfer of heat from the heating means 48 to the rotating chamber 50 and the foodstuffs within.

The pan 46 is placed below the rotating chamber and is removable, being intended to collect the cooked foodstuffs and thereafter, if required, to be used as a serving bowl. The components 42, 44 and 46 are, in this embodiment of the invention, designed and configured to fit, and be latched, together so as to present an integral appearance. These components can be designed and con figured to provide a desired visual effect.

The rotating chamber 50 can be rotated freely through 360 degrees about each of two orthogonal axes which intersect within the stationary housing and lid assembly 42, 44, by means including a motor 52, a yoke 54 and an elbowed drive relay mechanism 56. The chamber 50 is suspended within the yoke 54 for rotation about one of the aforesaid axes and the yoke 54 itself is mounted for rotation about the other axis. Thus, drive shaft 58 of the motor 52 drives the yoke 54 directly in rotation about a first axis 52a (the chamber rotating bodily with the yoke about that axis) whereas the elbowed drive mechanism 56 is configured to utilise the motor drive indirectly to rotate the chamber 50, within the yoke 54, about a second axis 56a; the two axes 52a and 56a being arranged to intersect orthogonally at the centre of the chamber 50.

Bearings 60 are assembled to the yolk 54 at the support locations for the chamber 50, so enabling the chamber 50 to rotate as required independently about the axis 56a.

Figure 8:
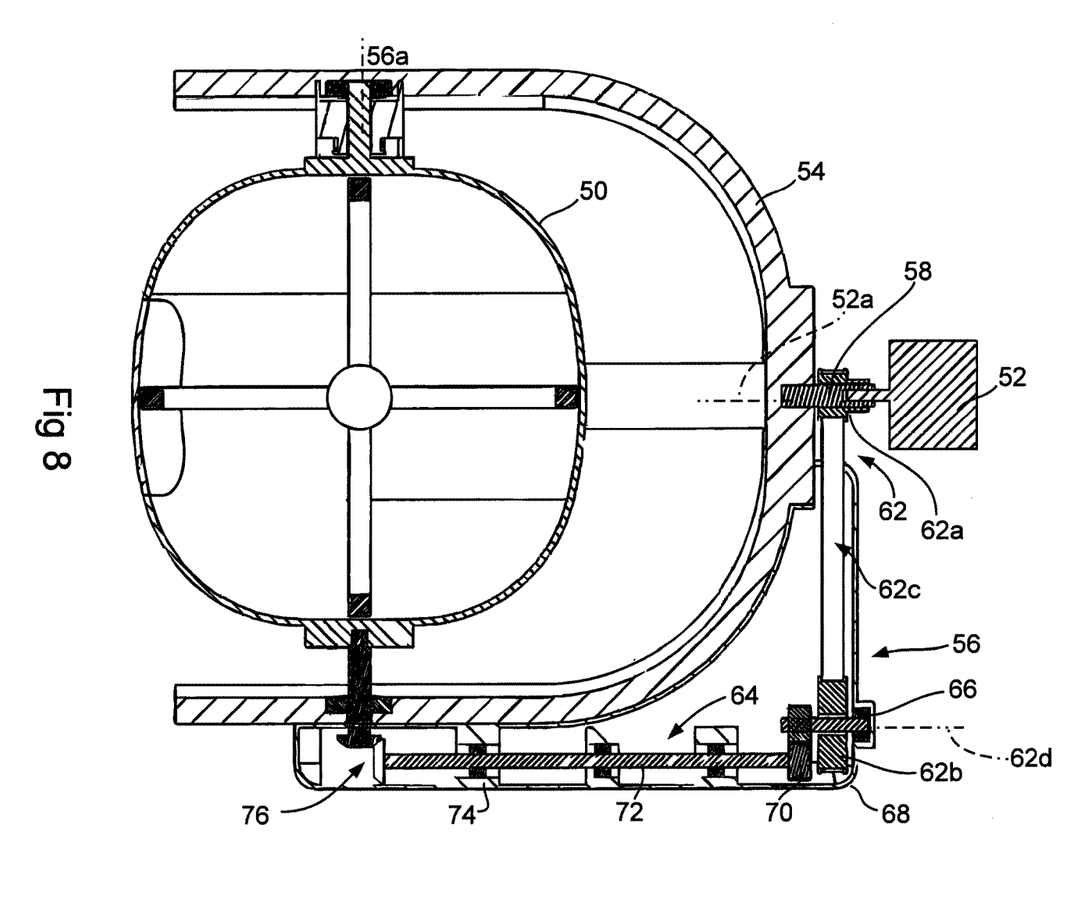
FIG. 8 shows a cross-sectional view through various components of a utensil as configured for said second embodiment.

To achieve rotation of the chamber 50 about the two mutually orthogonal axes 52a and 56a, the yolk 54 is, as already mentioned, configured to receive the drive from motor 52 directly via the drive shaft 58, whereas the chamber 50 receives its drive indirectly via the elbowed relay mechanism 56 which, in this embodiment and as best seen in FIG. 8, comprises a pulley and belt mechanism 62 and a gear system 64.

The pulley and belt mechanism 62 accommodates a driver pulley 62a, a driven pulley 62b and a belt 62c. The driver pulley 62a is coaxially mounted with the motor drive shaft 58, though it is fixed so that it cannot rotate about that axis. The driven pulley 62b, on the other hand, is mounted in bearings 66 provided within a housing part 68 that is attached to the yoke 54, the bearings 66 allowing pulley 62b to rotate freely about its axis 62d. The housing part 68 is supported on the yoke 54 and configured to contain the elbowed drive relay mechanism 56.

As the yoke 54, and thus the elbowed drive mechanism 56, rotate about the axis 54a, the belt 62c causes the driven pulley 62b to rotate about its axis 62d. Gearing 70 is then provided to transmit the rotary motion of the driven pulley 62b to a long shaft 72 which is supported by sufficient bearings such as 74 to make it structurally stable and to damp vibrations. At its end remote from the pulley 62b, the shaft 72 is provided with bevelled gearing 76 to drive the chamber 50 in rotation about its axis 56a.

Figure 9:
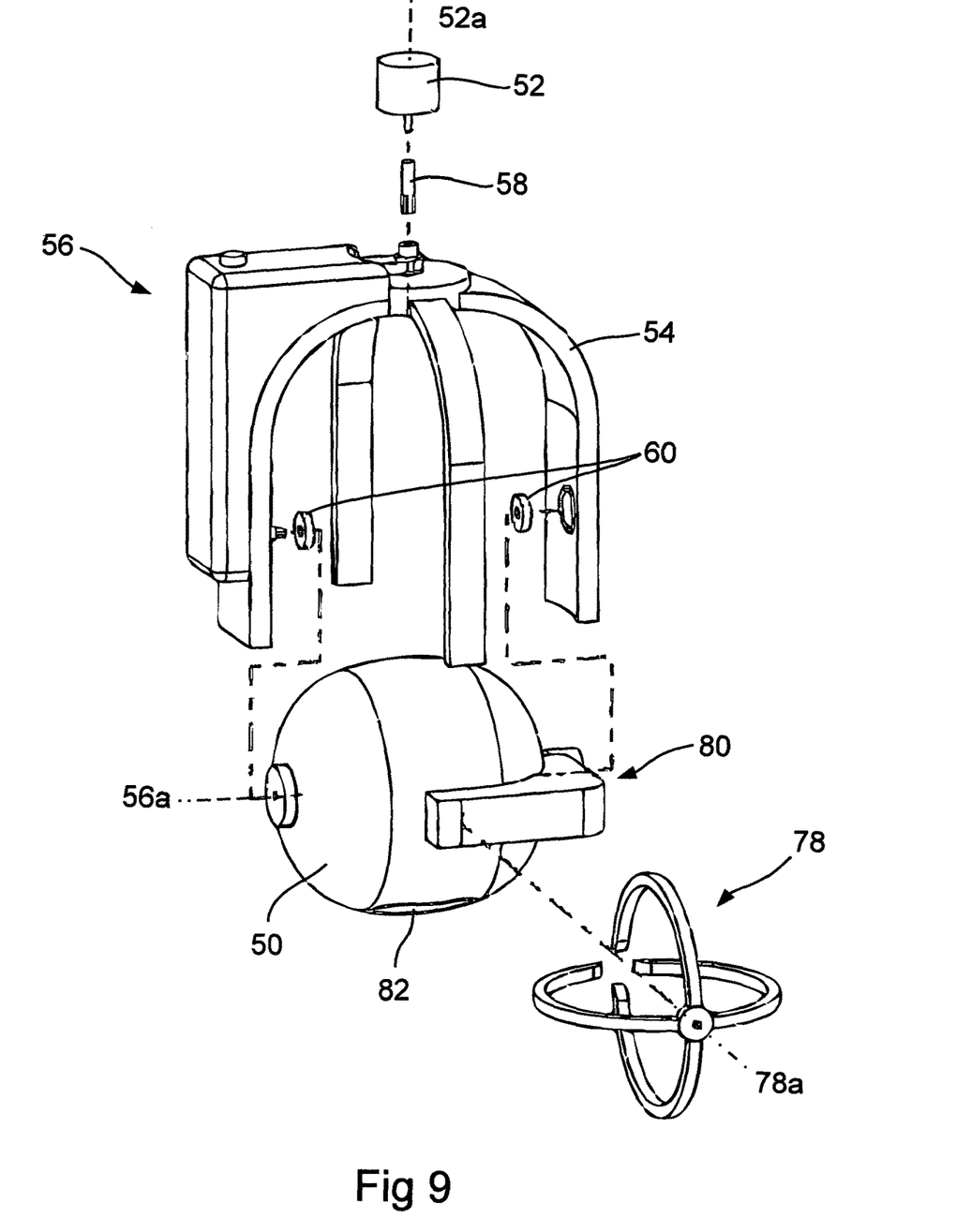
FIG. 9 shows, in exploded diagrammatic form, how a chamber that can be driven in rotation about two orthogonal axes can incorporate an inner yoke/paddle system that is rotatable about a third axis mutually perpendicular to the other two.
Figure 10:
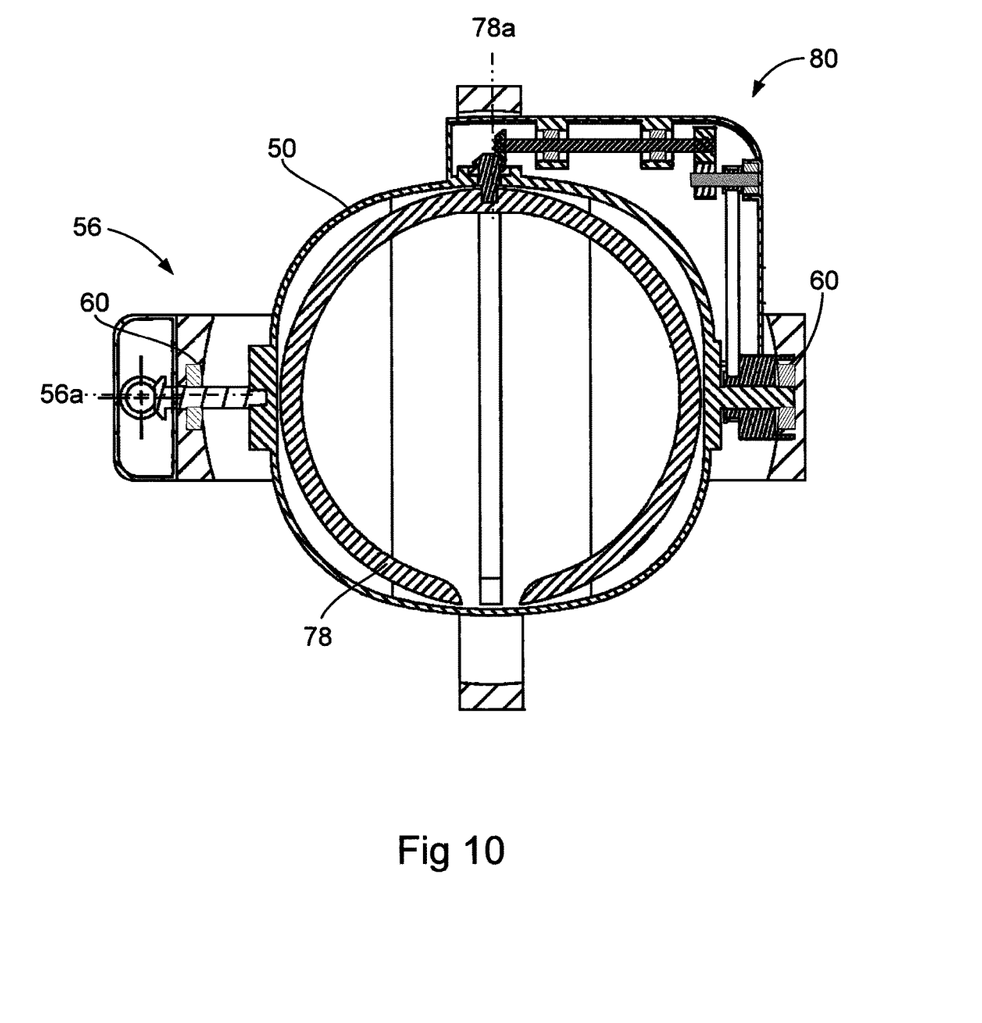
FIG. 10 shows a cross-sectional view principally through the processing chamber of the second embodiment and the inner yoke/paddle system.

Referring now to FIGS. 9 and 10, it can be seen that, as the chamber 50 rotates, it is arranged to further transmit rotational drive to an inner yolk assembly 78 comprising a set of paddles intended to rotate, within the chamber 50, about a third rotational axis 78a, which is orthogonal to and intersects the two axes 52a and 56a, by way of a second, inner elbowed drive relay system 80 which is similar to the drive system 56.

The components of the inner drive relay system 80 replicate those of the outer drive system 56 in all respects except dimensions, so will not be further described herein. The end result is that foodstuffs placed in the chamber 50 for processing are tumbled through 360 degrees about the orthogonal axes 52a and 56a and stirred by the inner yolk/paddle assembly 78 about the third orthogonal axis 78a.

The rotating chamber 50 has a lid 82 which can be opened to allow foodstuffs to be placed into and retrieved from the chamber, and which can be securely latched shut to ensure that the food does not escape therefrom during an operational cycle.

The invention claimed is:

1. A stirring/cooking utensil comprising
   a stationary support structure supporting at least one electric motor,
   a chamber for containing foodstuffs to be stirred and/or cooked,
   a heater,
   at least two drive members operatively connected with the at least one motor to rotate the chamber simultaneously about at least two substantially orthogonal and intersecting axes during a cooking/stirring procedure,
   wherein each drive member is arranged to rotate the chamber about one of the at least two axes and is arranged to allow simultaneous rotation about another of the at least two axes caused by another of the drive members.

2. A utensil according to claim 1, wherein the at least two drive members are configured to rotate the chamber through 360 degrees about all three axes.

3. A utensil according to claim 1, wherein the heater comprises one or more of an infra-red source, a microwave radiating device, induction coil heat transfer device, thermal conduction device, or thermal convection device.

4. A utensil according to claim 1, wherein a speed of the motor can be varied.

5. A utensil according to claim 1, further comprising a user programmable control to define one or more predetermined cycles of operation.

6. A utensil according to claim 1, wherein the stationary support structure and/or the chamber is/are arranged to cause the chamber to adopt a predetermined attitude following termination of a cooking/stirring procedure, thereby to facilitate removal of prepared foodstuffs from the chamber.

7. A utensil according to claim 1, wherein at least the outer surface of the chamber is substantially spherical, and wherein the stationary support structure comprises a closable casing adapted to contain the chamber and carries three compound wheel assemblies conditioned to support the chamber and to rotate the chamber about three substantially orthogonal and intersecting axes.

8. A utensil according to claim 7, wherein each of the compound wheel assemblies comprises a main wheel portion rotatable about a respective one of the axes and formed with a plurality of circumferentially spaced gaps in its periphery; each gap housing a respective smaller wheel portion rotatable about a respective axis perpendicular to a respective radius of the main wheel portion, with the smaller wheel portions being located such that the overall compound wheel assembly has a defined circumference.

9. A utensil according to claim 8, wherein each of the main wheel portions has associated therewith six smaller wheel portions evenly distributed around its circumference.

10. A utensil according to claim 7, wherein each compound wheel assembly is driven in rotation about its axis by means of a respective motor.

11. A utensil according to claim 1, wherein the stationary support structure supports the chamber for rotation within an outer yoke; the utensil arranged so the motor drives the outer yoke in rotation about a first of the axes and further comprising a drive relay mechanism mounted to the outer yoke to rotate the chamber about a second of the axes.

12. A utensil according to claim 11, further comprising an inner yoke configured as a paddle arrangement and mounted within the chamber for rotation about the third of the axes.

13. A utensil according to claim 12, further comprising a second drive relay mechanism mounted to the chamber and adapted to rotate the paddle arrangement about the third of the axes.

* * * * *